Figure 1:
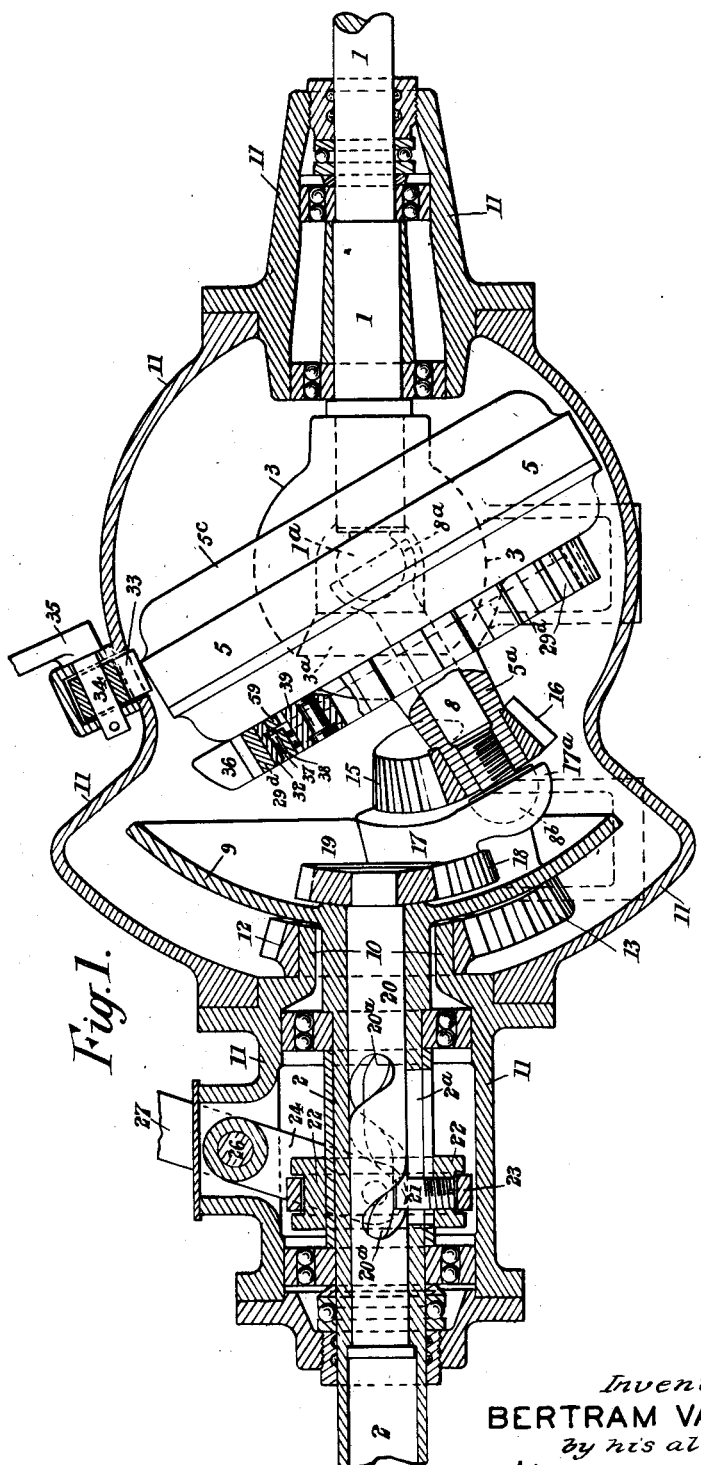

Feb. 25, 1930. B. VALLANCE 1,748,856
SPEED CHANGING GEAR
Filed March 2, 1929 4 Sheets-Sheet 2
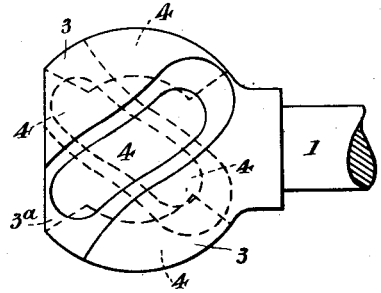
Fig.1ᵃ
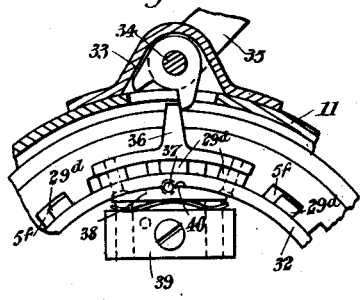
Fig.3ᵃ
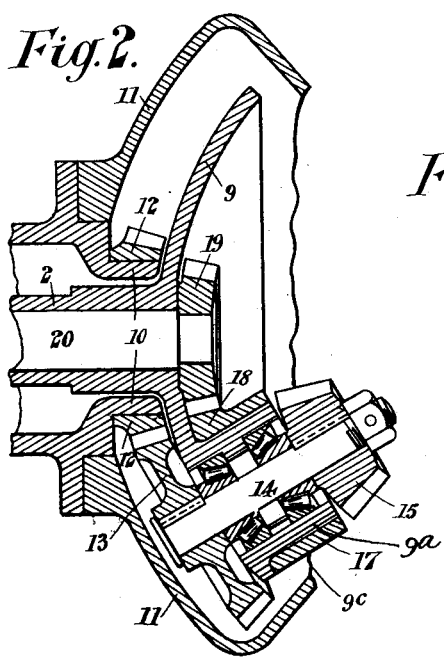
Fig.2.
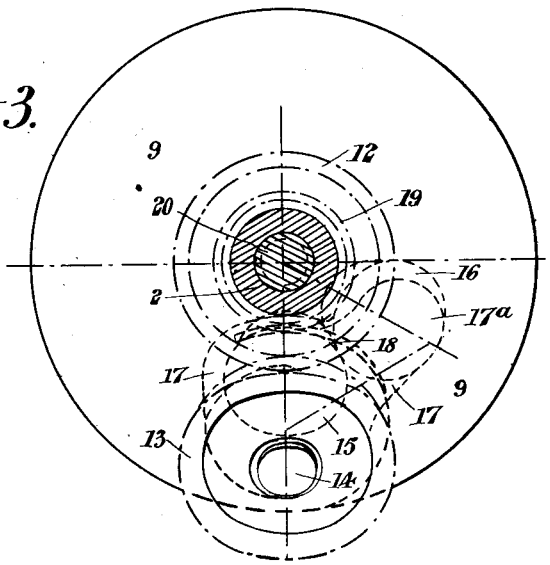
Fig.3.
Inventor
BERTRAM VALLANCE
by his attorneys
Howson and Howson

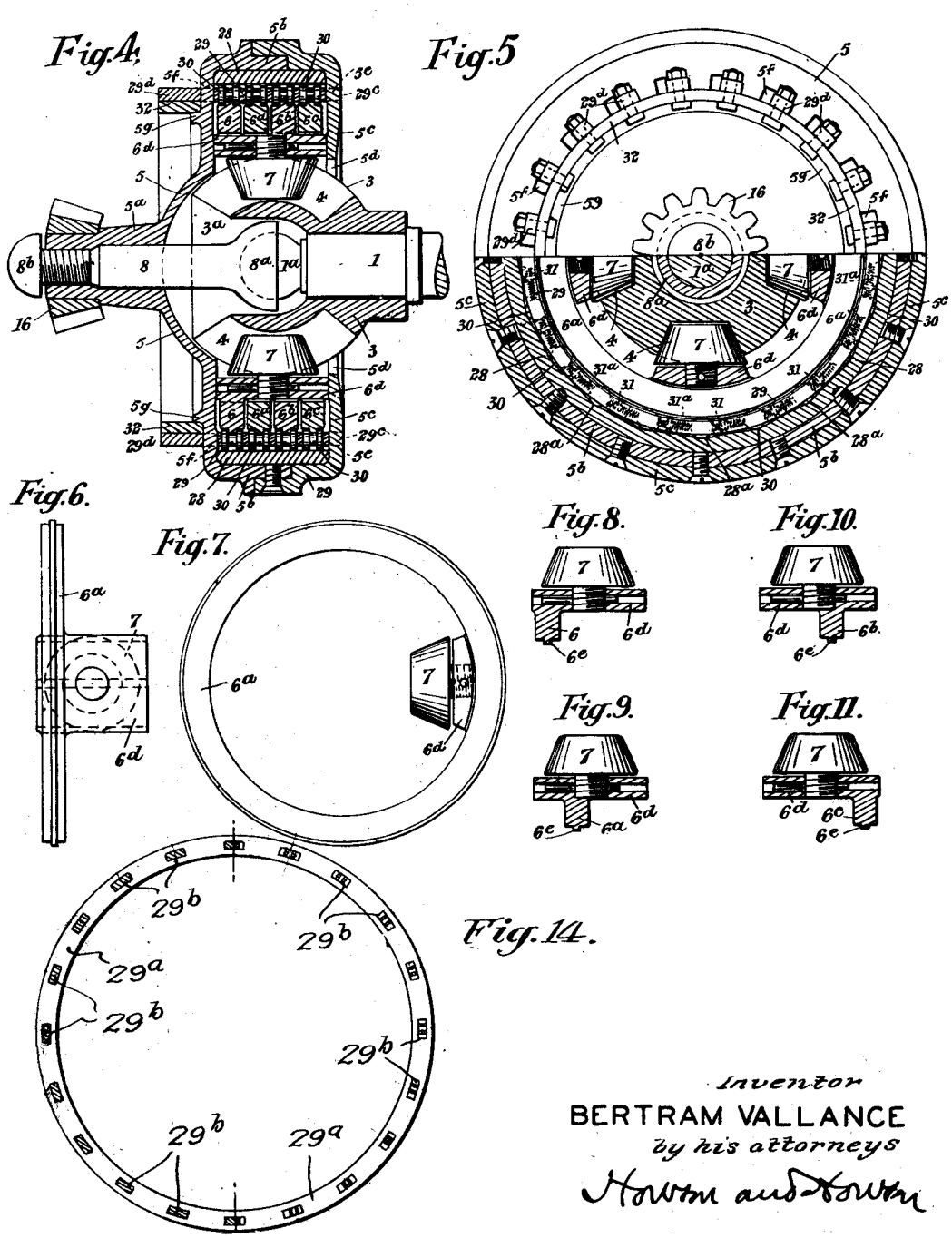

Feb. 25, 1930.  B. VALLANCE  1,748,856
SPEED CHANGING GEAR
Filed March 2, 1929  4 Sheets-Sheet 4

Inventor
BERTRAM VALLANCE
by his attorneys

Patented Feb. 25, 1930

1,748,856

UNITED STATES PATENT OFFICE

BERTRAM VALLANCE, OF WESTCLIFF-ON-SEA, ENGLAND

SPEED-CHANGING GEAR

Application filed March 2, 1929, Serial No. 344,078, and in Great Britain February 29, 1928.

My invention relates to speed changing gear and has for its object to provide an improved and simplified gear by which rotary motion can be transmitted from a driving element to a driven element in such manner that the speed of rotation of the driven member can, with great facility, be increased and decreased through an indefinite number of variations between two extreme limits of speed, for example, at any desired speed between zero speed and a predetermined maximum speed.

In my copending application Ser. No. 349,109, filed March 22, 1929 and patented February 25th, 1930, No. 1,748,907, I have described and claimed a "motion transmitting mechanism" wherein the driving element and the driven element move at a fixed speed ratio and are connected together through a driving ring which is tilted or oscillated in such a manner that every point in its circumference moves in a lemniscate path and thereby rotation of the driven element is effected.

According to my present invention the speed changing gear comprises a plate, ring or its equivalent, connected to a driving element and a driven element by means such that rotation of the driving element causes the said plate, ring, or its equivalent to tilt, or oscillate, in such manner that every point in its circumference moves in a lemniscate path, that is a path resembling a uniform figure 8 inscribed on the surface of a sphere and effects rotation of the said driven element at a speed in accordance with the degree of the tilting, or oscillating, movement of the said plate, ring, or its equivalent, and means for varying the degree of the said tilting, or oscillating, movement from zero to a maximum, or vice versa, so that the driven element can be rotated at any desired speed between two predetermined limits.

The plate, ring, or its equivalent (hereinafter referred to as a driving ring) in a preferred embodiment of this invention is adapted to be tilted, or oscillated, by an arm rotatable with the driving element, on a spherical head secured to or formed integrally with the driven element (hereinafter referred to as the driven shaft) so that every part, in succession, of the said driving ring is moved in one direction and simultaneously therewith the diametrically opposite part of the said ring is moved in the opposite direction similarly to the wobbling motion of a swash plate. Interposed between the driving ring and the spherical head on the driven shaft are free wheel clutch devices which, during the tilting, or oscillating, movements of the driving ring, are caused to act successively on the walls of slots or grooves which are inclined to the axis of the driven shaft and which are in the aforesaid spherical head. The combined action of the free wheel clutch devices effects the rotation of the driven shaft at a reduced speed which will be in accordance with the angle to which the said driving ring is tilted from the axis of the driven shaft.

Figure 12:
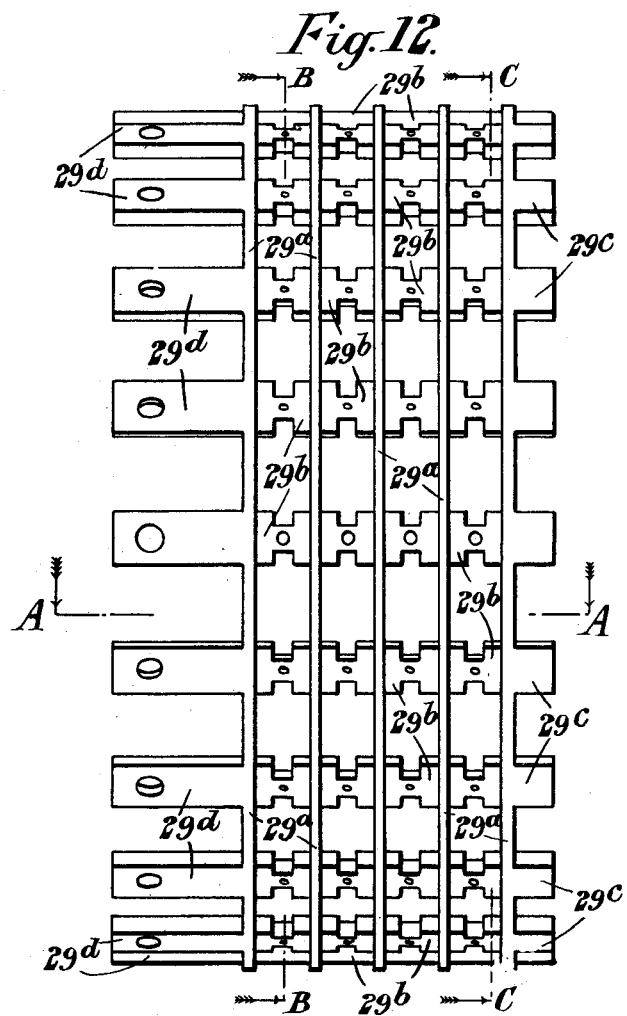

I will particularly describe my invention with reference to the accompanying drawings in which Figure 1 shows, in section, an example of speed change gear in accordance therewith. Figure 1ª shows, in elevation, the slotted, or grooved, spherical head on the driven shaft. Figure 2 is a section of a part of the gear showing the means for tilting, or oscillating, the driving ring and for varying the angle of the said ring relatively to the axis of the driven shaft. Figure 3 is a diagrammatic front elevation, with the gear casing removed, of the gear shown in Figure 2. Figure 3ª is a front elevation of the device shown in Figure 1 for effecting relative rotary movement between the driving ring and a cage within the said driving ring. Figure 4 shows, in section, the driving ring and the spherical head on the driven shaft. Figure 5 is a view, at right angles to Figure 4, showing in its upper half the driving ring in elevation, and in its lower half the partly spherical head and the said driving ring in section. Figures 6 and 7 show, in elevation at right angles to each other, one of the four free wheel clutch rings. Figures 8, 9, 10 and 11 are sections of the portions of the respective free wheel clutch rings upon which a roller is mounted. Figure 12 is a side elevation of the cage carried within the driving ring.

Figure 13:
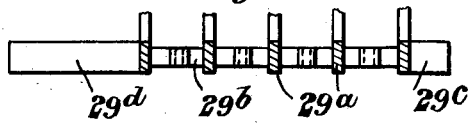

Figure 13 is a section taken on the line A, A. Figure 12 and Figure 14 is a section the right hand half of which is taken on the line B, B, and the left hand half on the line C, C, Figure 12.

The gear in the example illustrated comprises a driven shaft 1, in alignment with a driving element 2. On the inner end of the driven shaft 1 is secured a hollow spherical head 3 having four equally spaced slots, or grooves, 4 formed in its outer surface which are inclined at an angle of approximately 45° to the longitudinal axis of the said driven shaft. The inner end 1ª of the driven shaft 1 projects through the spherical head 3 into the hollow portion thereof and this projecting end is also spherical and constitutes a pivot for a driving ring 5 which embraces the spherical head 3, but is not in direct contact therewith. Within the driving ring 5 are four free wheel clutches 6, 6ª, 6ᵇ, and 6ᶜ each adapted, as hereinafter described, to be alternately clutched to and freed from the said driving ring 5 and each has a conical roller 7 mounted thereon which engages one of the four inclined slots, or grooves, 4 in the spherical head 3. The driving ring 5 has an elongated central boss 5ª mounted on a spindle 8 one end 8ª of which is cup-shaped and fits upon the spherical end 1ª of the driven shaft 1 and has at its other end a hemispherical, or approximately hemispherical, head 8ᵇ. An aperture 3ª in the spherical head 3 permits the spindle 8 and the boss 5ª of the driving ring 5 mounted thereon to tilt in any direction round the spherical end 1ª of the driven shaft 1 at any angle within a predetermined range. The wabbling, or tilting, movement of the driving ring 5 (which is effected without rotating it) causes the free wheel clutch rings, 6, 6ª, 6ᵇ and 6ᶜ to be successively locked to the driving ring 5 during a portion of their movement and during this period the conical roller 7 on that clutch ring which for the time being is locked to the said driving ring, bears upon the inclined slot, or groove, 4 in the spherical head 3 and imparts a partial rotary movement thereto, and as each clutch ring becomes operative a succession of partial rotations will be imparted to the said spherical head and the driving shaft 1 will be rotated at a uniform speed in proportion to the angle of tilt of the driving ring.

The direction in which the spherical head 3 rotates is controlled by the free wheel clutch rings 6, 6ª, 6ᵇ and 6ᶜ to which the conical rollers 7 are attached. When movement of the free wheel clutch rings 6, 6ª, 6ᵇ and 6ᶜ in a clockwise direction is prevented, the spherical head 3 will be rotated in a counter clockwise direction, and vice versa. The rollers 7 do not leave their respective slots, or grooves, but only travel to and fro therein. Since the driving ring 5 does not rotate, the inactive rollers (i. e. the rollers on those free wheel clutch rings which for the time being are not locked to the driving ring 5) will free-wheel or idle within the driving ring during rotation of the spherical head 3. At any given time only one roller in the example shown, will be active and impart a partial rotation to the spherical head, the remaining three rollers being inactive, but each in succession becomes active and imparts a partial rotation to the said head so that by the partial rotations effected by the rollers in succession the rotation of the head is effected as aforesaid.

In order to obtain smooth running of the driven shaft 1 it is necessary that the shape of the slots, or grooves, 4 be accurately determined and this may be effected as follows:

If, instead of the rollers 7, the clutch rings be provided with scribers with their points bearing upon the surface of the spherical head 3 and the spindle head 8ᵇ be rotated while the said head 3 is held stationary, each scriber point would inscribe a figure 8 on the said surface the axis of which would be parallel to the axis of the head. Presuming the rotation of the head 8ᵇ to be correctly and uniformly effected each described figure 8 would be exactly similar in shape and size, but if the angle of tilt be increased or decreased the described figure 8 would be proportionately increased or decreased in size. If the spherical head 3 be rotated at a uniform speed while the head 8ᵇ is rotating the figure 8 would be developed into a wavy line extending completely round the said head at an angle to the axis dependent upon the speed of rotation of the head 3 relatively to the speed of rotation of the head 8ᵇ. If, however, the rotation of the head 8ᵇ be carried through only a part of a rotation and the spherical head 3 be likewise only partly rotated, only one side of the figure 8 would be developed, making a single undulating line on the surface of the spherical head at an inclination and of a length required by the gear, and this undulating line constitutes the centre line for one of the slots, or grooves, 4. The slots, or grooves, 4 would, in practice, therefore be formed by a machine having a cutter adapted to be tilted and operate on the spherical head 3 whilst rotating. It therefore follows that as the spherical head 3 is rotated uniformly and the head 8ᵇ is also rotated uniformly the motion imparted to the spherical head and thence to the driven shaft 1 will also be uniform, and consequently a uniform rotary motion of the driving element 2 will be imparted to the driven shaft 1. This uniform rotary motion is continuous irrespective of the variation of the speed of rotation of the driven shaft 1 as, although the size of the figure 8 decreases or increases, this only has the effect of altering the angle between the slots, or grooves, 4 and the size of the figure 8 from which they were developed.

The wabbling movement of the driving ring 5 is effected by revolving the hemispherical end $8^b$ of the spindle 8 round an imaginary extension of the centre line of the driven shaft 1 as an axis. The amount of movement can be varied by altering the circumference of the path through which the end $8^b$ revolves. By moving the end $8^b$ of the spindle 8 nearer to the centre line of the driven shaft 1 the amount of wabbling of the driving ring 5 will be proportionately reduced until the said end is in alignment with the said centre line whereupon the wabblings will cease and the gear will be rendered neutral, or inoperative, that is, no rotary motion will be transmitted to the driven shaft 1.

The driving ring 5, in the example of gear shown, is caused to oscillate at any desired angle by the following means:—

The driving element is made up of a tubular element 2 (see Figure 1) having at its inner end a concave disc 9 formed integral therewith. To a boss 10 formed on the gear casing 11 and concentric to the driving element 2 is secured a toothed wheel, constituting a sun wheel 12, in engagement with a toothed wheel of equal diameter, constituting a planet wheel 13, secured to the outer end of a spindle 14 (see Figure 2) rotatably carried on the disc 9. A toothed wheel 15 of smaller diameter than the toothed wheels 12 and 13 is secured to the inner end of the spindle 14 and engages with a toothed wheel 16, of equal diameter, secured to the outer end of the boss $5^a$ of the driving ring 5. Mounted on a boss $9^a$ on the disc 9 through which the spindle 14 passes is an arm 17 having a cup-shaped end $17^a$ for the reception of the hemispherical head $8^b$ of the spindle 8 on which the driving ring 5 is mounted. For the purpose of altering the angle of tilt between the driven shaft 1 and the spindle 8 which spindle carries the driving ring 5 and is mounted to turn on the spherical head $1^a$ of the driven shaft as hereinbefore described, I form, integrally with arm 17, a toothed quadrant whose axis is the axis of shaft 14. This quadrant engages a toothed wheel 19 which is rigidly secured to the end of a shaft 20 and located within the tubular driving element 2. The shaft 20 is connected to the tubular driving element 2 by a pin 21 which passes through a slot $2^a$ in the said driving element and through a spiral slot $20^a$ in the shaft 20 so that movement of the said pin along the said slots causes the shaft 20 and the toothed wheel 19 secured thereto to rotate relatively to the tubular driving element 2, thus causing the toothed quadrant 18 and the arm 17 integral with the said quadrant to turn on the spindle 14 thereby turning the spindle 8 and altering the angle of tilt as desired. Presuming the parts to be in the position shown in Figures 1 and 2, the parts carried by the concave disc 9, the shaft 20 and the toothed wheel 19 thereon rotate as a unit with the driving element 2 and effect, through the arm 17, rotation of the head $8^b$ of the spindle 8 and, consequently, wabbling of the driving ring 5. The sun and planet wheels constitute a control means which permits the driving ring 5 to wabble but prevents the said ring rotating about its own axis while the angle of tilt remains constant. The driving ring 5 only turns on its axis when the angle of tilt is being adjusted and then only to a limited extent sufficient to alter the angle of tilt from neutral to maximum as hereinafter described. During the rotation of the parts as aforesaid the planet wheel 13 revolves round the stationary sun wheel 12.

In the hereinbefore described arrangement the driving ring 5 continuously moves or wabbles around the axis of the driven shaft 1, but maintains the angle between its own axis and the axis of the driven shaft, that is to say the angle of tilt remains constant. Thus under normal running conditions the driving ring 5 does not rotate about its own axis; but it does turn slightly on the spherical head 3 of the driven shaft 1 when variation of its degree of tilt with respect to the driven shaft 1, is effected.

The slots $2^a$ and $20^a$ are preferably of such length and the slot $20^a$ of such shape that when the pin 21 is at one end thereof the driven shaft 1 will be rotated in one direction, in a clock-wise direction for example, at a maximum speed, and as the said pin is moved towards the centre of the length of the said slots, thereby altering the inclination of the driving ring 5 relatively to the axis of the driven shaft, the speed of the said shaft will be proportionately reduced until the said pin arrives mid-way of the length of the said slots whereupon the driving ring 5 will be at right angles to the axis of the said shaft and rotation thereof will cease. Continued movement of the pin 21 in the same direction along the slots $2^a$ and $20^a$ will cause the driving ring 5 to be gradually inclined in the opposite direction and the driven shaft 1 to be rotated at a gradually increasing speed in the opposite direction, that is, in a counter-clock-wise direction, until the said pin arrives at the other end of the said slots when the said driving ring will be at its greatest inclination in the opposite direction and the driven shaft will be rotated at the maximum speed in the said counter clock-wise direction. Any suitable means may be provided for moving the pin 21 in the slots $2^a$ and $20^a$ for example this may be effected by a flanged shifter 22 slidable on, but rotatable with, the driving element 2, through which shifter the said pin projects. Freely mounted between the flanges of the shifter is a ring 23 connected to a fork-piece 24 mounted on a spindle 26 on the gear casing 11, the said fork-piece having a controlling lever 27 formed integrally therewith by which the shifter can be operated as desired.

Within the driving ring 5 is a cage 29, carrying spring pressed rollers 30, as hereinafter described, which normally move with the said driving ring, and means, also hereinafter described, are provided whereby the said cage can be partially rotated relatively to the said driving ring to effect reversal of the direction of rotation of the driven shaft 1 as the pin 21 passes from one side to the other of its mid-position in the slots $2^a$ and $20^a$.

The driving ring 5, as shown more clearly in Figure 4 is provided with an inwardly projecting annular flange $5^b$, to which is removably secured an inwardly flanged side-plate $5^c$ having an aperture $5^d$ therein, through which the spherical head 3 of the driven shaft 1 projects. The said flanged portion of the driving ring and the said flanged side-plate forms between them a chamber constituting a housing for the free wheel clutch rings 6, $6^a$, $6^b$ and $6^c$, a bearing ring 28 and the cage 29. The cage 29 carries spring-pressed rollers 30 which are interposed between the said bearing ring and the outer periphery of the said free wheel clutch rings.

The free wheel clutch rings 6, $6^a$, $6^b$ and $6^c$ are arranged side by side within the driving ring 5 as shown in Figure 4 and each of the said free wheel clutch rings, one $6^a$ of which is shown in Figures 6 and 7, is provided with a transversely projecting boss $6^d$ which extends the full width of the space between the opposed walls of the driving ring 5 and its side plate $5^c$ and each boss has a roller 7 mounted thereon mid-way of its length. The position of the bosses $6^d$ relatively to the free wheel clutch rings 6, $6^a$, $6^b$ and $6^c$ are shown in the sectional views Figures 8, 9, 10 and 11 and each of the said free wheel clutch rings has a central web $6^e$ on its outer periphery which enters a groove in the periphery of each of the spring-pressed rollers 30 of the series interposed between the said clutch ring and the bearing ring 28.

As hereinbefore stated, the spring pressed rollers 30 are carried in the cage 29 which, as shown in Figures 12, 13 and 14, consists of a number of equally spaced rings $29^a$ connected by a number of suitably shaped and equally spaced pieces $29^b$, preferably formed integrally with the said rings, constituting abutments for the controlling springs 31 and $31^a$ bearing on opposite sides of the rollers 30 as shown in Figure 5. The ring of the cage 29 adjacent the side-plate $5^c$ has a number of outwardly projecting pieces $29^c$ formed thereon which enter slots $5^e$ in the said side-plate. The ring of the said cage adjacent the side wall of the driving ring 5 has a number of similar, but longer, outwardly projecting pieces $29^d$ formed thereon which project through slots $5^f$ in the said side wall of the driving ring and are bolted to an external ring 32 rotatable on a collar $5^g$ on the driving ring 5, so that the said cage 29 and the ring 32 are capable of rotating, relatively to the driving ring 5, to an extent limited by the slots in the said driving ring into which the projecting pieces $29^c$ and $29^d$ on the cage 29 project.

The bearing ring 28 is formed with an undulating bearing surface the number of the waves of which is equal to the number of rollers interposed between one free wheel clutch ring and the said bearing ring. Each roller is situated in one of the shallow portions $28^a$ of the undulating surface and at the proper time one of the series of rollers is caused to lock the free wheel clutch ring appertaining to the said series to the bearing ring 28 by one or the other of the springs 31 or $31^a$ which tend to press the said rollers towards the crest portions of the undulating surface of the said bearing ring. In Figure 5 the springs 31 bearing on one side of the rollers are shown compressed and exert greater pressure on the said rollers than the distended springs $31^a$ bearing on the other side of the said rollers so that the said springs 31 only are active and in conjunction with the rollers act, at the proper time, to lock the respective free wheel clutch rings 6, $6^a$, $6^b$, $6^c$ to the bearing ring 28 so that the driven shaft 1 is rotated in one direction, for example in a clockwise direction. When however it is required to rotate the driven shaft 1 in the reverse direction, that is in a counter clockwise direction, the controlling lever 27 is operated to incline the driving ring 5 in the opposite direction, as hereinbefore described, and during this movement of the said driving ring a relative circumferential movement, limited by the slots $5^f$ between the driving ring and the cage 29 is effected by means hereinafter described. This relative movement causes the abutments $29^b$ on the cage 29 to move relatively to the rollers 30 thereby compressing the springs $31^a$ and permitting the springs 31 to distend so that the springs $31^a$ are now active and press the rollers 30 in the opposite direction to that in which the springs 31 pressed them, and consequently each of the free wheel clutch rings will be locked in succession to the bearing ring 28 only at such times during the oscillations of the driving ring 5 as will effect rotation of the driven shaft 1 in the said counter clockwise direction.

In Figures 1 and $3^a$ a suitable device is shown for partially rotating the cage 29 relatively to the driving ring 5 when the said ring has been moved to a position at right angles, or approximately at right angles, to the axis of the driving shaft 1. This relative rotation of the cage and driving ring is effected by the hereinafter described means while the driven shaft is idling. Thus, when the direction of rotation of the driven shaft is to be reversed the means, about to be described, must be actuated while the driven shaft is idling and before the lever 27 is shifted to throw the pin 21 away from mid position, all in order to reverse the driven shaft. This means comprises a double acting pawl 33 secured to a spindle 34 rotatably mounted on the gear casing 11 and having an operating lever 35 secured to its outer end, with which pawl an upwardly projecting piece 36 secured to the projecting pieces 29$^d$ of the cage 29 engages when the driving ring 5 is at right angles, or approximately at right angles, to the axis of the driven shaft 1 as shown in Figure 3$^a$. In order to show clearly the parts of the device secured to the projecting pieces 29$^d$ of the cage 29 as aforesaid, they are shown in the position they would occupy when the driving ring 5 is at right angles to the axis of the driven shaft 1. By turning the lever 35 in the proper direction one of the pawls of the double acting pawl 33 will, through the upwardly projecting piece 36 partially rotate the cage 29 until the projecting pieces thereon engage with the opposite wall of the slots 5$^f$, so that the driven shaft 1 will be rotated in the opposite direction when the driving ring 5 has been further turned on its axis to an angle opposite to that shown in Figure 1. Upon the return of the driving ring 5 to a position at right angles to the axis of the driving shaft 1 the upwardly projecting piece 36 will engage with the other pawl of the double pawl 33 so that by operating the lever 35 the cage 29 can be turned relatively to the driving ring 5 to the original position shown in Figure 3$^a$. This may be effected as shown by a pin 37 carried by a spring-pressed piece 38 slidably carried in a block 39 secured to the driving ring 5, the said pin engaging with one or the other of the slots 40 formed in the under surface of the ring 32.

It is to be understood that the invention is not limited to the precise arrangements and construction of the parts hereinbefore described and illustrated in the accompanying drawings as modifications may be made without departing from the scope of the invention.

In the following claims when I speak of the driving ring I include thereby all structures equivalent to that shown and described and I do not limit myself to the specific embodiment shown. When I speak of the driving ring being tiltable I mean to include not only the capacity of the driving ring 5 to have the angle which it makes with the axis of the driving and driven shafts, altered, but also the peculiar wabbling motion given to the driving ring by the rotation of the head 8$^b$ of the spindle 8 about the axis of the driving and driven shafts as a center. Thus one complete rotation of the head 8$^b$ around the periphery of a circle whose center is the axis of the driving and driven shafts will move the driving ring through one cycle of movement.

Having now particularly described and ascertained the nature of my said invention and in what manner the same is to be performed, I declare that what I claim is:—

1. A speed changing gear comprising driving ring means, driving and driven elements connected by said driving ring means, said means being tiltable upon the driven element and said driven element and driving ring means having cooperating spherically curved surfaces, one of said curved surfaces having grooves, free wheel clutch devices each having roller means engaging in one of said grooves, said clutch devices being carried by one of said elements, means actuated by the driving element causing the driving ring to oscillate in such a manner that every point in its circumference moves in a lemniscate path and also causing the driven element to rotate at a speed proportional to the angle of tilt of the driving ring means to said driven element.

2. A speed changing gear comprising driving ring means, driving and driven elements connected by said driving ring means, said means being tiltable upon the driven element and said driven element and driving ring means having cooperating spherically curved surfaces, one of said curved surfaces having grooves, free wheel clutch devices each having roller means thereon, engaging in one of said grooves, said clutch devices being carried by one of said elements, means actuated by the driving element causing the driving ring to move in such a manner that every point in its circumference moves in a lemniscate path and causing the driving element to rotate at a speed proportional to the angle of tilt of the driving ring means to said driven element, and means operable to alter said angle of tilt.

3. A speed changing gear comprising a driving element, a driven element having a spherical head with grooves therein, a tiltable driving ring connected to the driving element and surrounding said spherical head, free wheel clutch devices carried by said driving ring to successively be locked to and freed from said driving ring during each cycle of said driving ring, and roller means mounted on said clutch devices and engaging in said grooves whereby to rotate said driven element when said driving ring is moved through its cycle of movement.

4. A speed changing gear comprising a driving element, a driven element having a spherical head with grooves therein, a tiltable driving ring connected to the driving element and surrounding said spherical head, free wheel clutch devices carried by said driving ring to successively be locked to and freed from said driving ring during each cycle of said ring, and roller means mounted on said clutch devices and engaging in said grooves whereby to rotate said driven element when said driving ring is moved through its cycle of movement, every point in the circumference of said driving ring moving in a lemniscate path during each cycle.

5. A speed changing gear, comprising a driving element, a driven element having a spherical head, a spindle, a driving ring mounted on the spindle, said spindle having one end connected to the driven element, a ball and socket connection within said spherical head for connecting said spindle and driven element, in combination with a disc rotatable with said driving element, said disc carrying an arm rotatable with said disc, and a ball and socket connection between the outer end of said arm and the other end of said spindle.

6. A speed changing gear comprising a driving element, a driven element having a spherical head with grooves therein, a tiltable driving ring connected to the driving element and surrounding said spherical head, free wheel clutch devices on said driving ring to successively be locked to and freed from said driving ring during each cycle of said ring and roller means mounted on said clutch devices and engaging in said grooves whereby to rotate said driven element when said driving ring is moved through its cycle of movement, a spindle, said driving ring being mounted on said spindle, ball and socket connections between said driving element and said spindle and between said driven element and said spindle, in combination with means to adjust the position of one end of said spindle relatively to the axis of the driving shaft.

7. A speed changing gear comprising a driving element including a disc, an arm on and rotatable with said disc, a toothed quadrant on said arm, a shaft located axially within the end of and rotatable with said driving element, a toothed wheel cooperating with said quadrant and mounted upon said shaft, and means for causing relative rotative movement between said shaft and said driving element.

8. A speed changing gear comprising a driving element including a disc, an arm on and rotatable with said disc, a toothed quadrant on said arm, a shaft located within the end of and rotatable with said driving element, a toothed wheel cooperating with said quadrant and mounted upon said shaft, and means for causing relative rotative movement between said shaft and said driving element, in combination with a sun and a planet wheel operatively associated with said disc and said arm whereby to prevent said relative rotative movement when said driving elements and shaft are rotating together.

9. A speed changing gear comprising a driving element including a disc, an arm on and rotatable with said disc, a toothed quadrant on said arm, a shaft located axially within the end of and rotatable with said driving element, a toothed wheel cooperating with said quadrant and mounted upon said shaft, and means comprising a pin and slot mechanism for causing relative rotative movement between said shaft and said driving element, in combination with a sun and a planet wheel operatively associated with said disc and said arm whereby to prevent said relative rotative movement when said driving element and shaft are rotating together.

10. A speed changing gear comprising a driving element, a driven element having a spherical head having grooves therein, a driving ring associated with said elements, a cage and a bearing ring within said driving ring, said bearing ring having an undulating inner peripheral surface, and free wheel clutch devices each provided with roller means engaging with one of said grooves, and spring pressed means between said undulating surface and said clutch devices.

11. A speed changing gear comprising a driving element, a driven element having a spherical head, grooves therein, a driving ring associated with said elements, a cage and a bearing ring within said driving ring, said bearing ring having an undulating inner peripheral surface, and free wheel clutch devices each provided with roller means engaging with one of said grooves, and spring pressed means between said undulating surface and said clutch devices, all in combination with means for changing the direction of rotation of said driven element.

In testimony whereof I have signed my name to this specification.

BERTRAM VALLANCE.

CERTIFICATE OF CORRECTION.

Patent No. 1,748,856.  Granted February 25, 1930, to

BERTRAM VALLANCE.

It is hereby certified that error appears in the printed specification of the above numbered patent requiring correction as follows: Page 5, line 41, after the period and before the word "This" insert the sentence "If desired, the driving ring 5 may be yieldably locked to the cage 29 in either of their extreme relative positions."; and that the said Letters Patent should be read with this correction therein that the same may conform to the record of the case in the Patent Office.

Signed and sealed this 25th day of March, A. D. 1930.

(Seal)

M. J. Moore,
Acting Commissioner of Patents.